Sept. 8, 1959  H. H. MATHEWS  2,903,479
PREPARATION OF ESTERS OF ACRYLIC ACID
Filed March 7, 1956
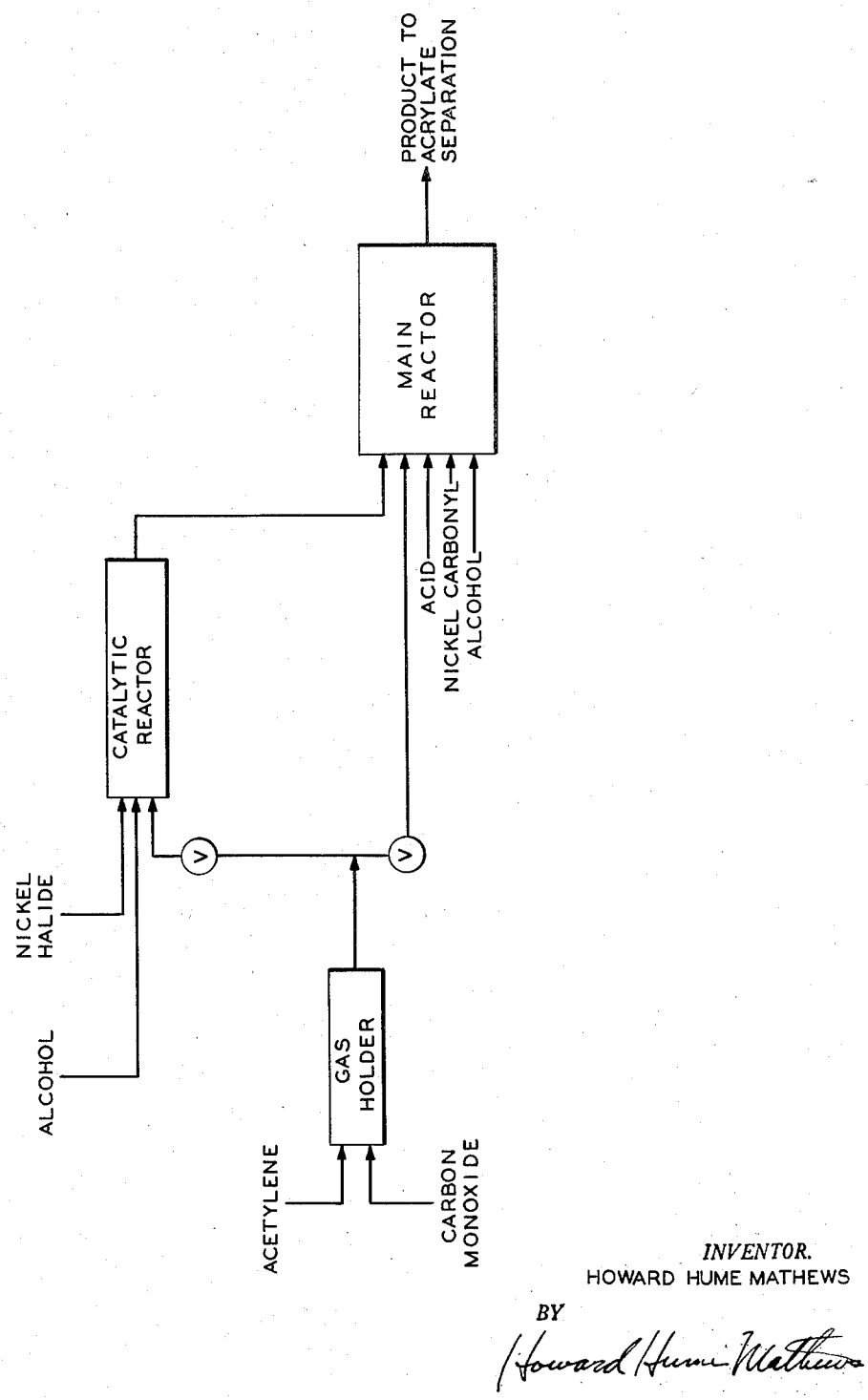
INVENTOR.
HOWARD HUME MATHEWS
BY a corporation of New York

2,903,479

PREPARATION OF ESTERS OF ACRYLIC ACID

Howard Hume Mathews, Mountain Lakes, N.J., assignor to Air Reduction Company, Incorporated, New York, N.Y., a corporation of New York Application March 7, 1956, Serial No. 569,969

14 Claims. (Cl. 260—486)

This invention relates to a method for preparing acrylic esters of a saturated aliphatic alcohol, and, more specifically, pertains to an improved process for preparing such esters by the reaction of acetylene, carbon monoxide, and a saturated aliphatic monohydric alcohol in the presence of nickel carbonyl and an acid.

It has heretofore been known, due to the work of Dr. Walter Reppe as exemplified by German Patent No. 855,110, that esters of acrylic esters can be prepared by the reaction of acetylene, alcohol, and carbon monoxide in accordance with the over-all equation

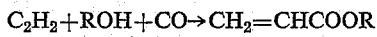

$$C_2H_2 + ROH + CO \rightarrow CH_2=CHCOOR$$

When this reaction was conducted at reduced temperatures, i.e., below about 75° C., the carbon monoxide which reacted with acetylene was obtained from nickel carbonyl and the reaction was effected in the presence of an acid substance, such as hydrogenhalide, phosphoric, sulfuric, and organic acids. Previous attempts to react acetylene with carbon monoxide and alcohol at reduced temperatures were not completely successful, since difficulties were encountered in initiating and maintaining the reaction. For example, previous processes required stoichiometric amounts of nickel carbonyl to initiate the reaction and could not be started up in the presence of carbon monoxide; if not carefully controlled, the reaction would stop and could not again be started except by shutting off the flow of gaseous carbon monoxide.

In accordance with the present invention, a method has been developed whereby the reaction of acetylene, carbon monoxide, an alcohol, nickel carbonyl, and an acid can be initiated and maintained in the presence of carbon monoxide. This object is obtained by reacting a portion of the acetylene-carbon monoxide gas mixture catalytically with an alcohol in the presence of a nickel halide catalyst, the reaction product of this reaction being fed into the main reaction zone wherein the reaction of acetylene, carbon monoxide, alcohol, nickel carbonyl, and acid occurs.

The process of this invention is particularly adapted for continuous operation. The accompanying drawing illustrates in diagrammatic form the present process. When operating continuously, a mixture of acetylene and carbon monoxide is prepared. A portion of this gas mixture is fed continuously into an auxiliary, or catalytic, reaction vessel which is also charged with nickel halide and an alcohol. The remaining portion of the acetylene and carbon monoxide gas mixture is fed continuously into a main, or second, reaction vessel which is charged with nickel carbonyl, alcohol, and acid. The reaction products resulting from the auxiliary or catalytic reaction are fed continuously, as they are formed, into the main, or second, reaction vessel. The reaction mixture formed in the second vessel is continuously drawn off, and the mixture is treated to separate acrylate ester, nickel salt by-product, and unreacted alcohol. When starting up, the major portion of the acetylene-carbon monoxide gas mixture is diverted to the auxiliary reaction vessel until an adequate amount of catalytic reaction product is formed and charged into the main reaction vessel to induce reaction there. As the reaction proceeds, the portion of acetylene-carbon monoxide mixture fed to the auxiliary reactor is decreased and that portion fed to the main reactor increased. As long as the reaction in the main reactor, namely that of acetylene, carbon monoxide, alcohol, nickel carbonyl and acid, proceeds satisfactorily, the reaction products formed in the auxiliary reactor may be kept at a minimum, but, in the event difficulties are encountered in maintaining the reaction in the main reactor, additional catalytic reaction products are necessary and the flow of acetylene-carbon monoxide gas mixture to the auxiliary reactor may be increased. Of course, the amount of alcohol and nickel halide charged to the auxiliary reactor should be proportioned to the rate of acetylene-carbon monoxide gas flow into the reactor. Similarly, the charge to the main reactor of alcohol, nickel carbonyl, and acid should be proportioned in accordance with the quantity of acetylene-carbon monoxide mixture fed into the main reactor.

The reaction taking place in the auxiliary reactor involves the preparation of acrylic ester by the inter-reaction of acetylene, carbon monoxide and alcohol in the presence of a nickel halide catalyst. Suitable catalysts for this reaction are the nickel halides, such as nickel chloride, nickel bromide, and nickel iodide. Nickel chloride is preferred as the catalytic material. This reaction is conducted at elevated temperatures (100°–200° C.) and pressures (2–30 atmospheres). Temperatures higher than 200° C. result in undesirable side reactions, principally the polymerization of acrylic ester. Some polymerization may occur even at the preferred reaction temperatures and it is advantageous to add polymerization inhibitors, such as hydroquinone, resorcinol, β-naphthol and the like, to the reaction mixture. Because of the possibility of side reactions taking place in the catalytic reaction, it is preferred practice to have the bulk of the preparation of acrylic ester take place in the main reactor, utilizing the reaction products of the auxiliary or catalytic reaction primarily to initiate and maintain the direct reaction of acetylene, carbon monoxide, alcohol, nickel carbonyl, and acid.

The reaction taking place in the main reactor involves the inter-reaction of acetylene, carbon monoxide, alcohol, nickel carbonyl, and an acid. The initiation and maintenance of this main reaction is promoted by the presence of the reaction products from the auxiliary or catalytic reactor. The main reaction takes place at reduced temperatures, i.e., 0°–75° C., and preferably between 30°– 45° C. Atmospheric pressure may be employed, although slight increases in pressure (up to 2 atm.) may expedite the reaction. The acid used may be inorganic, such as hydrochloric acid, sulphuric acid, or phosphoric acid, or organic, such as acetic acid, propionic acid, succinic acid, or oxalic acid. However, hydrochloric acid is preferred. Normally, about equimolar amounts of acid and nickel carbonyl are used, although slight excesses of nickel carbonyl may also be employed. The reaction product obtained from the main reactor is treated to separate the acrylate ester from the nickel salt, and unreacted alcohol. Any convenient separation technique may be used. A suitable method involves extracting the reaction product containing acrylate ester, alcohol, and nickel salt with water. The aqueous layer is distilled to recover the nickel salt as residue and a fraction of ester and alcohol. This fraction may be returned to the second or main reactor or further treated as by distillation to separate the alcohol from ester. The nickel salt residue may be converted to nickel carbonyl or a portion thereof may be used to supply the catalyst in the auxiliary reactor. The non-aqueous layer from the extraction is fractionally distilled to separately recover the ester and alcohol. The alcohol may conveniently be recycled.

While the over-all reaction may be represented by the equation $$C_2H_2 + CO + ROH \rightarrow CH_2=CH-COOR$$

excess amounts of acetylene and alcohol are preferred. For example, the molar ratio of acetylene to CO may vary from 1:1 to 1.5:1; and the molar ratio of alcohol to CO may vary from 1:1 to 3:1.

In some instances, it may be advantageous to carry out the reactions in an inert solvent medium. For example, ethers such as isopropyl ether, tetrahydrofurane, and dioxane; ketones such as acetone, methyl ethyl ketone; and hydrocarbons, such as benzene, toluene, or xylene, may be used as inert diluents.

The alcohol employed is a saturated aliphatic monohydric alcohol, and may be represented by the formula ROH wherein R is either a branched or straight chain alkyl radical, and is preferably, methyl, ethyl, propyl, isopropyl, and butyl.

The invention is more fully illustrated by the following example, in which the parts given are by weight.

*Example*

The reactor system comprises acetylene and carbon monoxide gas lines metered to measure gas flow, a gas holder to hold the mixture of acetylene and carbon monoxide, a pressure vessel for the catalytic reaction, and a main or second reaction vessel. The necessary valves are situated in the gas line between the gas holder and the reaction vessels so that the quantity of gas mixture passing to each of the reaction vessels can be regulated. The gas mixture may be pressed into the pressure vessel by means of a pump, and pressure reducing means are positioned on the exit side of the pressure vessel in order to reduce the pressure of the discharge from the auxiliary reaction to a value equal to or slightly above the pressure in the main reactor. The system is further arranged so that all the reactants may be fed continuously into the respective reaction vessels, and the reaction products conveyed continuously from the vessels into the respective reaction mixture streams. Provision is made in the pressure vessel to continuously withdraw reaction products and circulate them to the main reaction vessel. The main reaction vessel in similarly designed so that the final reaction product may be withdrawn continuously.

With the apparatus so designed and assembled, the reaction system is purged with nitrogen to remove any oxygen which may be present. The reaction or main vessel is charged with 495 parts of ethyl acrylate and 307 parts of ethyl alcohol. The pressure or auxiliary vessel is charged with about 790 parts of ethyl alcohol and 181 parts of nickel chloride. The gas mixture is pressed into the pressure vessel until a pressure of from about 35 to 40 atm. is obtained. The temperature of the mixture in the pressure vessel is raised by external heating, and the reaction starts at about 145° C. The temperature is maintained at from about 145°–170° C., cooling when necessary. As the reaction proceeds, the reaction product is bled off as it forms and continuously circulated into the main reaction vessel. The reactant feed rates to the main reactor are initially introduced as follows: acetylene-CO mixture, 40 parts per hour; nickel carbonyl, 56 parts per hour; anhydrous ethyl alcohol, 73.6 parts per hour; and anhydrous hydrogen chloride, 20 parts per hour. Upon introduction of the products from the pressure vessel into the main reactor, a short induction period prevails and then the reaction proceeds smoothly in the main reactor. The reaction temperature in the main reactor is maintained at 40–45° C. by cooling, and the pressure is atmospheric. As the reaction proceeds over a course of 10–30 minutes, the flow of the acetylene-CO gas mixture and other reactants to the pressure vessel are decreased, and the feed rate of reactants to the second or main reactor are proportionately increased. The reactant feed rates to the main reactor are changed to the following: acetylene-CO mixture, 229 parts per hour; ethyl alcohol, 230 parts per hour; nickel carbonyl, 56 parts per hour; and anhydrous hydrogen chloride, 20 parts per hour. The reaction product from the main reaction vessel is continuously withdrawn to maintain a constant level in the vessel. The reaction is permitted to continue for a period of about seven hours. The reaction mixture containing essentially ethyl acrylate, nickel chloride, and unreacted ethyl alcohol, is washed with about 15 liters of water. Ethyl acrylate is recovered from the organic layer by fractional distillation and from the aqueous layer by distillation. The total yield of ethyl acrylate is 2750 parts which boils at 99°–100° C. The refractive index of the product is 1.4055 at 20° C.

What is claimed is:

1. A process for preparing an ester of acrylic acid which comprises forming a gas mixture of acetylene and carbon monoxide, passing a portion of said gas mixture into a first reaction zone and a further portion of said gas mixture into a second reaction zone, reacting in said first reaction zone said gas mixture with a lower alkanol in the presence of a nickel halide catalyst at an elevated temperature and pressure, withdrawing the products of said reaction and introducing said products into said second reaction zone, and reacting in said second reaction zone said further gas mixture portion with a lower alkanol, nickel carbonyl, and an acid at a temperature between 0°–75° C.

2. A process for preparing an ester of acrylic acid as defined in claim 1, wherein the quantity of said acetylene-carbon monoxide gas mixture passing into each of said reaction zones is so regulated that a major portion of said gas mixture passes into said first reaction zone on initiation of the process, whereas a major portion of said gas mixture passes into the second reaction zone after an initial induction period.

3. A process for preparing an ester of acrylic acid which comprises forming a gas mixture of acetylene and carbon monoxide, passing a portion of said gas mixture into a first reaction zone and a further portion of said gas mixture into a second reaction zone, reacting in said first reaction zone said gas mixture with a saturated aliphatic monohydric alcohol selected from the group consisting of methyl alcohol, ethyl alcohol, propyl alcohol, isopropyl alcohol and butyl alcohol in the presence of a nickel halide catalyst at an elevated temperature and pressure, withdrawing the products of said reaction and introducing said products into said second reaction zone, and reacting in said second reaction zone said further gas mixture portion with nickel carbonyl, an acid, and a saturated aliphatic monohydric alcohol selected from the group consisting of methyl alcohol, ethyl alcohol, propyl alcohol, isopropyl alcohol, and butyl alcohol, at a temperature between 0°–75° C.

4. A process for preparing an ester of acrylic acid as defined in claim 3, wherein the quantity of said acetylene-carbon monoxide gas mixture passing into each of said reaction zones is so regulated that a major portion of said gas mixture passes into said first reaction zone on initiation of the process, whereas a major portion of said gas mixture passes into the second reaction zone after an initial induction period.

5. A process for preparing an ester of acrylic acid as defined in claim 3 wherein said saturated aliphatic monohydric alcohol is methyl alcohol.

6. A process for preparing an ester of acrylic acid as defined in claim 3 wherein said saturated aliphatic monohydric alcohol is ethyl alcohol.

7. A process for preparing an ester of acrylic acid as defined in claim 3 wherein said saturated aliphatic monohydric alcohol is butyl alcohol.

8. A process for preparing an ester of acrylic acid which comprises forming a gas mixture of acetylene and carbon monoxide, passing a portion of said gas mixture into a first reaction zone and a further portion of said gas mixture into a second reaction zone, reacting in said first reaction zone said gas mixture with a lower alkanol in the presence of a nickel halide catalyst at a temperature of from about 100°–200° C., and at a pressure in the range of about 2–40 atmospheres, withdrawing the products of said reaction and introducing said products into said second reaction zone and reacting in said second reaction zone said further gas mixture portion with a lower alkanol, nickel carbonyl and hydrogen chloride at a temperature of from 0°–75° C.

9. A process for preparing an ester of acrylic acid as defined in claim 8, wherein the quantity of said acetylene-carbon monoxide gas mixture passing into each of said reaction zones is so regulated that a major portion of said gas mixture passes into said first reaction zone on initiation of the process, whereas a major portion of said gas mixture passes into the second reaction zone after an initial induction period.

10. A process for preparing an ester of acrylic acid which comprises forming a gas mixture of acetylene and carbon monoxide, passing a portion of said gas mixture into a first reaction zone and a further portion of said gas mixture into a second reaction zone, reacting in said first reaction zone said gas mixture with a saturated aliphatic monohydric alcohol selected from the group consisting of methyl alcohol, ethyl alcohol, propyl alcohol, isopropyl alcohol and butyl alcohol in the presence of a nickel halide catalyst at a temperature of from about 100°–200° C., and at a pressure in the range of about 2–40 atmospheres, withdrawing the products of said reaction and introducing said products into said second reaction zone and reacting in said second reaction zone said further gas mixture portion with nickel carbonyl, hydrogen chloride, and a saturated aliphatic monohydric alcohol selected from the group consisting of methyl alcohol, ethyl alcohol, propyl alcohol, isopropyl alcohol, and butyl alcohol, at a temperature of from 0°–75° C.

11. A process for preparing an ester of acrylic acid as defined in claim 10, wherein the quantity of said acetylene-carbon monoxide gas mixture passing into each of said reaction zones is so regulated that a major portion of said gas mixture passes into said first reaction zone on initiation of the process, whereas a major portion of said gas mixture passes into the second reaction zone after an initial induction period.

12. A process for preparing an acrylic acid ester as defined in claim 10, wherein said saturated aliphatic monohydric alcohol is methyl alcohol.

13. A process for preparing an acrylic acid ester as defined in claim 10, wherein said saturated aliphatic monohydric alcohol is ethyl alcohol.

14. A process for preparing an acrylic acid ester as defined in claim 10, wherein said saturated monohydric alcohol is butyl alcohol.

References Cited in the file of this patent

UNITED STATES PATENTS

| | | |
|---|---|---|
| 2,582,911 | Neher et al. | Jan. 15, 1952 |
| 2,653,969 | Albrecht et al. | Sept. 29, 1953 |